United States Patent [19]

Kuranaga et al.

[11] Patent Number: 5,148,430
[45] Date of Patent: Sep. 15, 1992

[54] TRANSMITTER/RECEIVER FOR GENERATING TRANSMITTING DATA SIGNAL IN SYNCHRONIZATION WITH RECEIVED DATA SIGNAL

[75] Inventors: Hiroshi Kuranaga; Kouji Gotou, both of Hyogo, Japan

[73] Assignee: Mitsubishi Denki Kabushiki Kaisha, Tokyo, Japan

[21] Appl. No.: 660,825

[22] Filed: Feb. 26, 1991

[30] Foreign Application Priority Data

Jun. 5, 1990 [JP] Japan .................................. 2-148182

[51] Int. Cl.$^5$ .............................................. H04J 3/06
[52] U.S. Cl. .................................. 370/100.1; 370/108; 375/109; 340/825.14
[58] Field of Search ............................ 370/100.1, 108; 340/825.14; 375/109, 108

[56] References Cited

U.S. PATENT DOCUMENTS

| | | | |
|---|---|---|---|
| 3,509,471 | 4/1970 | Puente ........................... | 375/120 X |
| 3,639,838 | 2/1972 | Kuhn et al. ..................... | 375/107 |
| 4,604,582 | 8/1986 | Strenkowski et al. .......... | 370/108 X |
| 4,941,141 | 7/1990 | Hayano ........................... | 370/100.1 X |

OTHER PUBLICATIONS

Kondo, "Development for ISDN's Interface LSI", EIC Technical Study Report, vol. 89, No. 204 Sep. 21, 1989, pp. 29-30.
International Telegraph and Telephone Consultative Committee, Study Group XVIII-Report-R 21(C), Jul. 1986.

*Primary Examiner*—Douglas W. Olms
*Assistant Examiner*—Russell W. Blum
*Attorney, Agent, or Firm*—Lowe, Price, LeBlanc & Becker

[57] ABSTRACT

A transmitter/receiver applicable as an interface circuit in ISDN terminals is disclosed. In externally designated total phase deviation measurement mode, the delay time caused by a receiver circuit and a driver circuit, i.e. a phase difference, is predetected by a phase comparator. The detected phase difference signal is stored in a phase control circuit, and the phase control circuit controls the pahse of a periodical timing signal generated from a PLL circuit. Therefore, as a data buffer applies a transmitting data to the driver circuit 7 in response to the phase control timing signal, the phase difference of the transmitting data signal generated from the driver circuit relative to the received data signal is made to be the minimum.

11 Claims, 8 Drawing Sheets

| Un | Dn | R | V | Un+1 | Dn+1 |
|----|----|----|----|----|----|
| L | H | | | L | H |
| H | H | ⤓ | X | ⤓ | H |
| H | L | | | H | ⤒ |
| L | H | | ⤒ | ⤒ | H |
| H | H | X | ⤓ | H | ⤓ |
| H | L | | | H | L |
| L | L | PROHIBIT | | | |

TRANSMITTER/RECEIVER FOR GENERATING TRANSMITTING DATA SIGNAL IN SYNCHRONIZATION WITH RECEIVED DATA SIGNAL

BACKGROUND OF THE INVENTION

1. Field of the Invention

The invention generally relates to a transmitter/receiver, and particularly to a transmitter/receiver for generating a transmitting data signal in synchronization with a received data signal. The invention has particular applicability to a transmitter/receiver for the Integrated Service Digital Network (ISDN).

2. Description of the Background Art

The Integrated Service Digital Network (referred to as ISDN hereinafter) is known as a system for implementing various kinds of communication such as telephone, facsimile communication, data communication and video communication by digitized networks. In conventional communication systems prior to ISDN, interfaces between user's terminal equipments and each of the communication networks have been adapted for fixed usages, such as use for telephone and use for data communication. However, in ISDN, a unified interface is defined for the purpose of the above mentioned various services. This interface is called the multipurpose user network interface and clearly defined by the International Telegraph and Telephone Consulative Committee (referred to as CCITT hereinafter).

An application of ISDN is shown in FIG. 7. Referring to FIG. 7, in ISDN, an ISDN exchanger 18 at a telephone office and ISDN terminal equipments at a user's home (TE) are connected through a telephone line 28. With a network termination equipment (NT) 100 provided at the user's home, the telephone line 28 and a 4-wire home bus are connected therewith. Each ISDN terminal is connected to the network termination equipment 100 through the 4-wire home bus 19. At the network termination equipment 100 and each input/output section of ISDN terminals, a transmitter/receiver 27 is provided as an interface circuit to transmit and receive data signals between each other through the 4-wire home bus 19.

As an example of an ISDN terminal, a simplified block diagram of a telephone 20 is shown in FIG. 8. Referring to FIG. 8, the telephone 20 comprises the transmitter/receiver 27 connected to the 4-wire home bus 19 through a signal transmit/receive transformer 1, an LAPD (Link Access Procedure D channel) controller 22 for performing the layer 2 function of an ISDN basic interface, a microprocessor 23 for performing the layer 3 function of the ISDN basic interface, a key pad 24, a CODEC (coder/decoder) device 25 for coding and decoding audio signals, and a handset 26. The transmitter/receiver 27 is provided to implement the layer 1 function of the ISDN basic interface. The 4-wire home bus line 19 comprises a transmitting bus 19a for transmitting transmitted signals from the telephone 20 and a receiving bus 19b for transmitting a received signal to be applied to the telephone 20.

In operation, a received signal transmitted through the receiving bus 19b is received by the transmitter/receiver 27 through the transformer 1. The received signal is applied to the CODEC device 25 through the LAPD controller 22. The CODEC device 25 converts the received signal into a sound signal and then applies the converted signal to the handset 26. The sound signal generated from the handset 26 is converted to a digital signal by the CODEC device 25. The converted digital sound signal is applied to the transmitter/receiver 27 through the LAPD controller 22. The transmitter/receiver 27 supplies the converted digital sound signal to the transmitting bus 19a as a transmitting signal through the transformer 1.

The conventional transmitter/receiver 27 in FIG. 8 is shown in FIG. 9. Referring to FIG. 9, this transmitter/receiver 27 comprises a receiver circuit 2 connected to the receiving bus 19b through a receiving transformer 1a, a data buffer 3 for holding a received data signal S3, a phase locked loop (referred to as PLL hereinafter) circuit 4 for generating a periodical timing signal S5 in synchronization with the received data signal S3, a data buffer 6 for holding transmitting data Dt applied from the LAPD controller 22 in response to the periodical timing signal S5, and a driver circuit 7 for driving the transmitting bus 19a in response to the held transmitting data Dt.

In operation, a received data signal is applied to the receiver 2 through the receiving bus 19b and receiving transformer 1a. The receiver 2 waveform-shapes the received data signal and applies the waveform-shaped signal S3 to the data buffer 3 and the PLL circuit 4. The data buffer 3, after holding the applied data signal S3, transmits the held signal to the LAPD controller 22 as received data Dr. The PLL circuit 4, in response to the received data signal S3, generates a periodical timing signal S5, and applies it to the data buffer 6. The data buffer 6, in response to the applied timing signal S5, holds the received data Dt from the LAPD controller 22. The driver circuit 7, in response to the transmitting data held by the data buffer 6, drives the transmitting bus 19a through the transmitting transformer 1b.

The change in timing of signals and the waveforms in the circuit of FIG. 9 are shown in FIG. 10. Referring to FIG. 10, the received data signal S1 transmitted through the receiving bus 19b, as indicated in FIG. 10, has had its waveform changed. This change of waveform depends on the frequency characteristic of the receiving bus 19b. The receiver 2, upon receiving this received data signal S1, outputs the waveform shaped signal S3. Therefore, as indicated in FIG. 10, the signal S3 has delay $\Delta t3$ in comparison with the signal S1. Moreover, the PLL circuit 4, in response to this signal S3, generates the periodical timing signal S5 and the data buffer 6, in response to the signal S5, holds the transmitting data Dt. Since the driver circuit 7 drives the transmitting bus 19a in response to the transmitting data held within the data buffer 6, the transmitting signal S2 which appears on the transmitting bus 19a is further delayed by time $\Delta t4$ compared to the rising timing of the signal S5. As a result, the transmitting signal S2 on the transmitting bus 19a is to be delayed by time $\Delta t5$ ($=\Delta t3+\Delta t4$) compared to the rising timing of the received signal S1. The time delay $\Delta t4$ is caused mainly by the driver circuit 7. This is because the driver circuit 7 has to drive the transmitting bus 19a having a large load.

Referring to FIG. 11, the connection between the network termination equipment (NT) 100 and the ISDN terminals TE1 and TE2 is shown. The terminals TE1 and TE2 are connected to the network termination equipment 100 through the transmitting bus 19a and the receiving bus 19b respectively. Each of the terminals TE1 and TE2 and the network termination equipment 100 is provided with the transmitter/receiver 27 for transmission and reception of data signals.

The two terminals TE1 and TE2 connected to the network termination equipment 100 can be used simultaneously. That is, data are transmitted and received by the two terminals TE1 and TE2 through time division. Since the transmission and reception of data are performed through time division, the ISDN terminal is generally needed to generate a transmitting data signal in synchronization with a received data signal. This requirement is defined in the above mentioned recommendation I.430 (basic user network interface) by CCITT.

FIG. 12 shows a relation between generation timings of a received data signal RX1 and a transmitting data signal TX1 at one ISDN terminal. Generally, an ISDN terminal generates the transmitting data signal TX1 in response to a periodical timing signal generated based on the received data signal RX1. Therefore, as indicated in FIG. 12, the change timing of the transmitting data signal TX1 is delayed by $\Delta t1$ from the change timing of the received data signal RX1. According to the recommendation I.430 by CCITT, this time delay $\Delta t1$ is required to be within the range between $-7\%$ and $+15\%$ of one bit period. This time delay $\Delta t1$ is referred to as a total phase deviation in the recommendation I.430.

Generally, more than 2 ISDN terminals are connected to one network termination equipment through a 4-wire home bus. Two of the ISDN terminals can be used simultaneously. That is, these two terminals transmit and receive data signals through one network termination equipment through time division. For example, as indicated in FIG. 11 the case in which the two terminals TE1 and TE2 are used simultaneously, is described in the following.

The terminal TE1 outputs the transmitting data signal TX1 in synchronization with the received data signal RX1. Likewise, the terminal TE2 outputs the transmitting data signal TX2 in synchronization with the received data signal RX2. The received data signals TX1 and TX2 have the above mentioned delay compared to the received data signals RX1 and RX2. Two transmitting data signals TX1 and TX2 are overlapped on one transmitting bus 19a, through which the signals are transmitted to the network termination equipment 100. Therefore, as shown in FIG. 13, when the transmitting data signals TX1 and TX2 having the phase difference $\Delta t6$ are overlapped on the transmitting bus 19a, a transmitting data signal $TX (=TX1+TX2)$ having the waveform as shown is obtained. This transmitting data signal TX indicates a stable value during the time $\Delta t7$ in the central part of each pulse waveform.

As can be understood from the waveform of the transmitting data signal TX shown in FIG. 13, it is noted that the larger the phase difference $\Delta t6$ between two transmitting data signals TX1 and TX2 becomes, the shorter the period $\Delta t7$ representing the stable value in the overlapped signal TX becomes. In other words, the above mentioned recommendation I.430 by CCITT requests that the phase difference $\Delta t1$ between the received data signal RX1 and the transmitting data signal TX1 at each terminal lies within the given range, in order to secure the length of this stable period $\Delta t7$.

As shown in FIG. 10, the conventional transmitter/receiver 27 outputs the transmitted data signal S2 delayed by the phase difference $\Delta t5$ compared to the received data signal S1. As this phase difference $\Delta t5$ becomes larger, the transmitter/receiver satisfying the requirement of the recommendation I.430 can not be obtained. As a result, the period $\Delta t7$ shown in FIG. 13 becomes shorter and a transmitting data signal generated from each terminal will not be transmitted to the network termination equipment 100 correctly.

SUMMARY OF THE INVENTION

One object of the present invention is to carry out transmission and reception of a data signal accurately in a transmitter/receiver which transmits a transmitting data signal in synchronization with a received data signal.

Another object of the present invention is to reduce the phase difference between a transmitting data signal and a received data signal in a transmitter/receiver which generates the transmitting signal in synchronization with the received data signal.

Yet another object of the present invention is to provide a transmitter/receiver in accordance with the recommendation of CCITT I.430.

Briefly, the transmitter/receiver in accordance with this invention transmits a transmitting data signal through a transmitting bus line in synchronization with a received data signal received through a receiving bus line. This transmitter/receiver includes a receiving circuit for receiving the received data signal through a receiving bus line, and a periodical timing signal generation circuit generating a periodical timing signal in synchronization with the received data signal. A transmitting data generation circuit generates the transmitting data signal in response to the periodical timing signal, and a sends circuit transmitting the transmitting data signal through the transmitting bus line. In response to an externally applied signal designating a predetermined mode, a circuit supplies the transmitting data signal generated from the transmitting circuit to the receiving circuit. A phase difference detection circuit detects the phase difference between the transmitting data signal generated from the transmitting circuit and the signal generated from the receiving circuit. A timing control circuit controls timing of the supply timing signal generated from the periodical timing signal generation circuit to the transmitting data generation circuit in response to the phase difference detection circuit.

In operation, when the predetermined mode is externally designated, a transmitting data signal generated from the transmitting circuit is supplied to the receiving circuit. The phase difference detection circuit detects the phase difference between the transmitting data signal generated from the transmitting circuit and the transmitting data signal generated from the receiving circuit. The timing control circuit, in response to the detected phase difference signal, controls the supply timing of the timing signal generated from the periodical timing signal generation circuit to the transmitting data generation circuit. That is, the transmitting data generation circuit is responsive to the timing controlled-periodical timing signal to generate the transmitting data signal, thereby permitting the phase difference between the transmitting data signal and the generated received data signal to be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
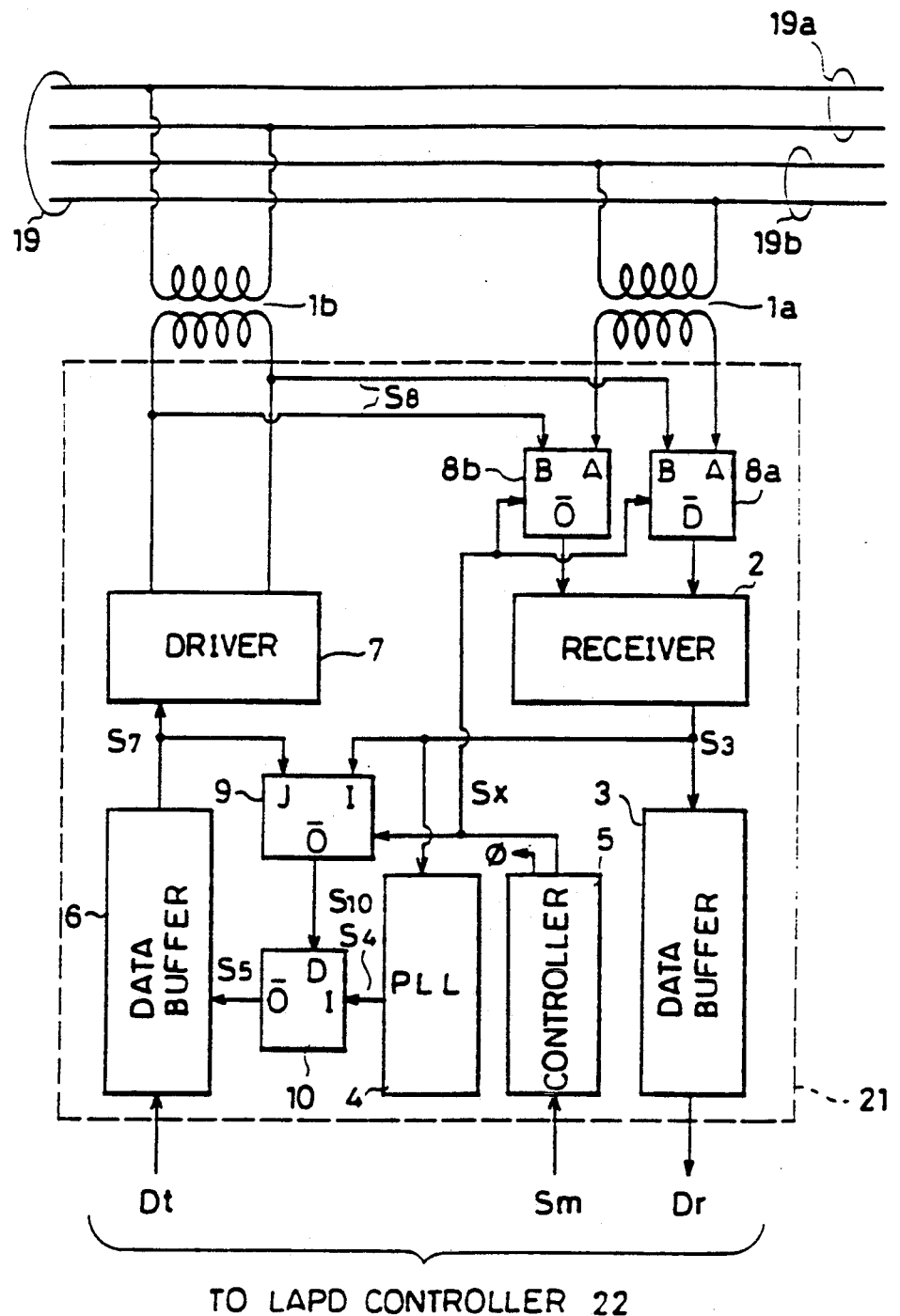
FIG. 1 is a block diagram of a transmitter/receiver representing one embodiment of the present invention.
Figure 9:
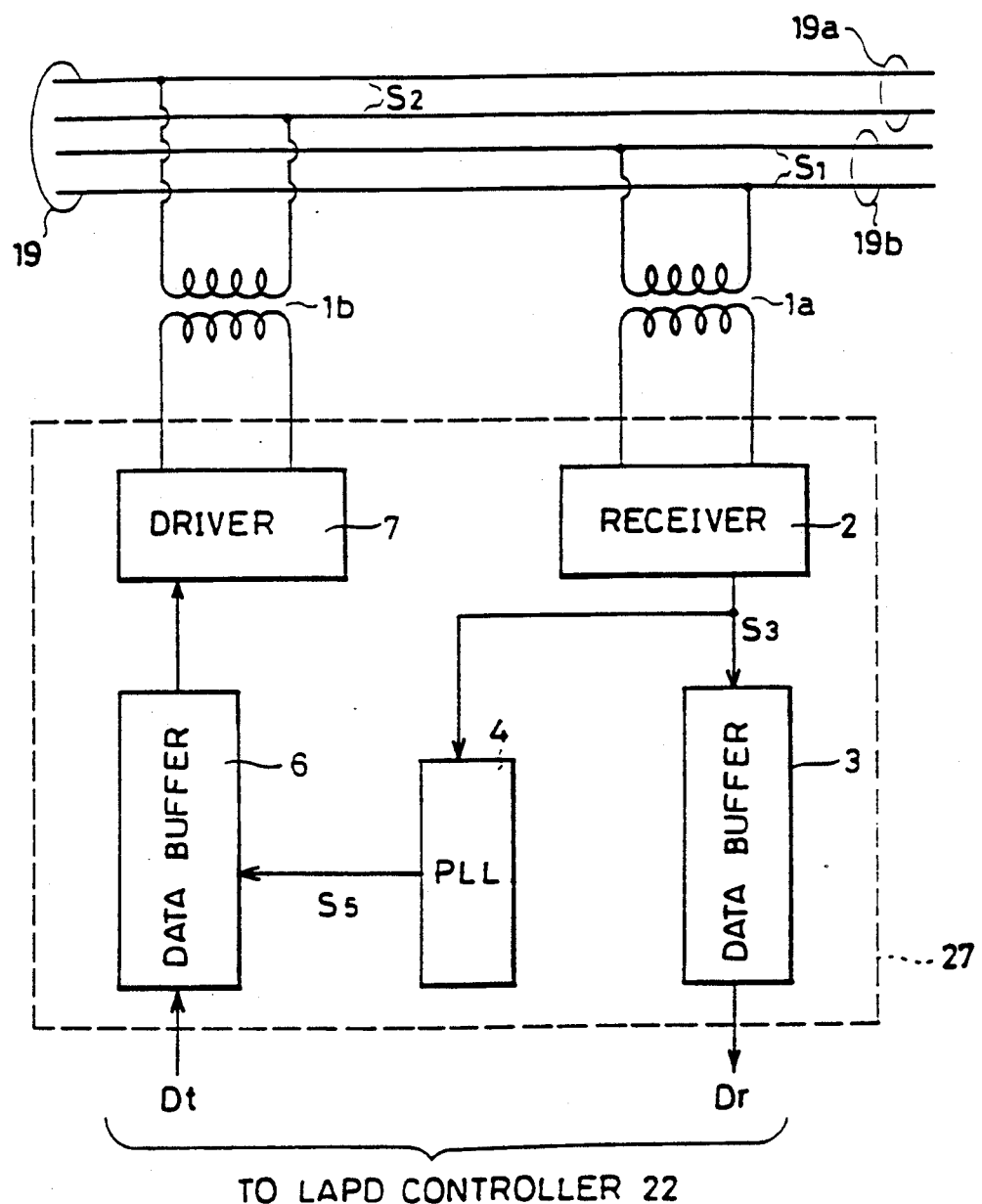
FIG. 9 is a block diagram of the conventional transmitter/receiver shown in FIG. 8.
Figure 10:
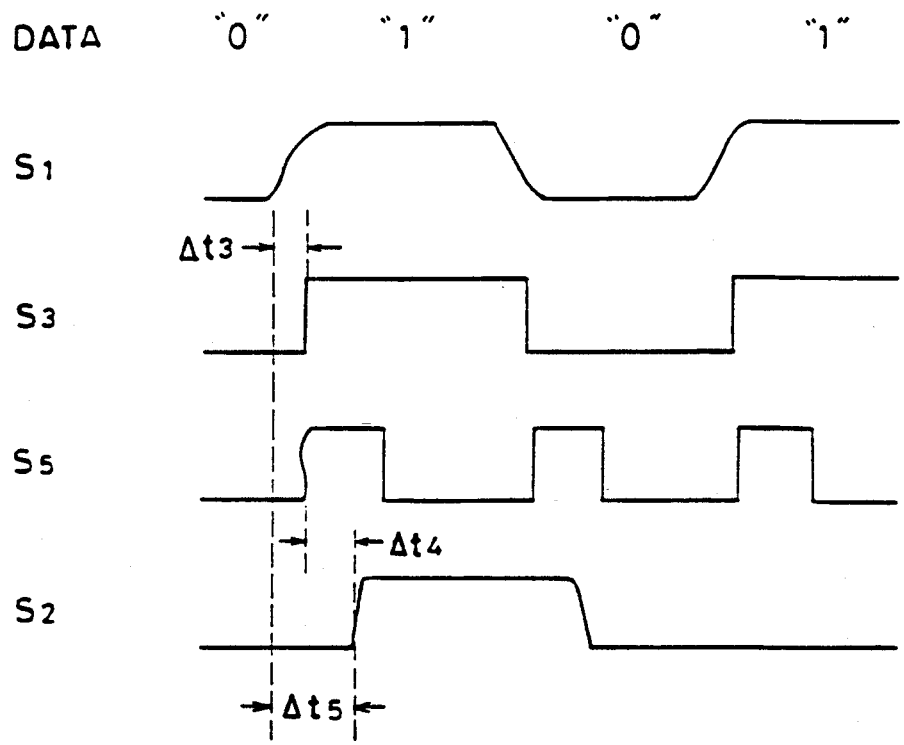
FIG. 10 is a timing diagram of the transmitter/receiver shown in FIG. 9.
Figure 11:
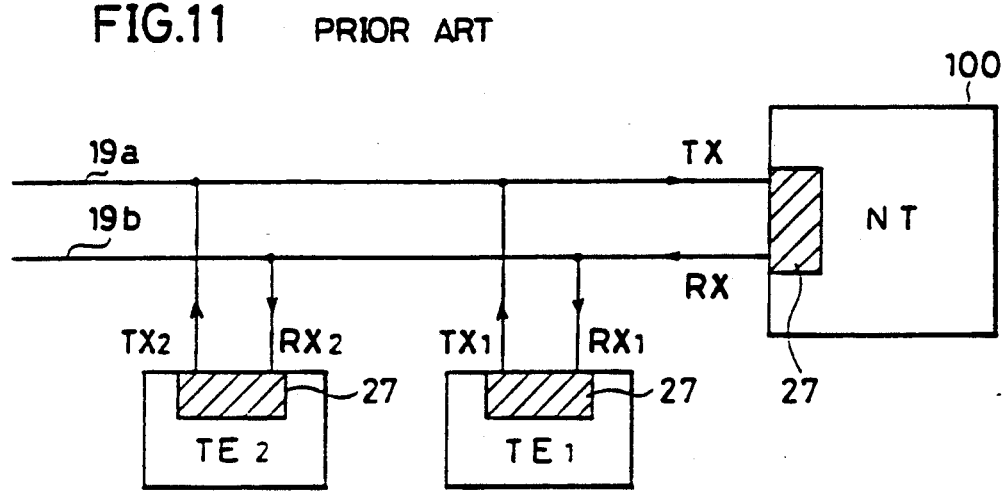
FIG. 11 is a block diagram showing the connection between the network termination equipment and ISDN terminals.

In comparison with the conventional transmitter/receiver 27 in FIG. 9, the transmitter/receiver 21 shown in FIG. 1 further comprises switches 8a and 8b for selecting either a received data signal from the receiving bus 19b or a signal S8 output from the driver circuit 7, a phase comparator 9 comparing the phases between an output signal S3 of the receiver circuit 2 and an output signal S7 of the data buffer 6, and a phase control circuit 10 controlling the phase of a periodical timing signal S4 generated from the PLL circuit 4. A control part 5 is connected to receive a signal Sm designating a total phase deviation measuring mode from the LAPD controller 22.

The operation of the transmitter/receiver 21 shown in FIG. 1 will be described hereinafter. First, upon reception of a signal Sm for designating a total phase deviation measuring mode from the LAPD controller 22, the control part 5 generates a switching signal Sx. The switches 8a and 8b are responsive to the signal Sx to select an output of the driver circuit 7 (i.e. terminal B). Therefore, an output signal S8 from the driver circuit 7 is applied to the receiver circuit 2 through the switches 8a and 8b. The data buffer 6 receives a periodical timing signal S4 generated from the PLL circuit 4 through the phase control circuit 10 (a signal S5) and is responsive to the applied signal S5 to generate a transmitting data signal S7 for measurement. The generated signal S7 is applied to each of the driver circuit 7 and the phase comparator 9. Therefore, the transmitting data signal S7 for measurement is applied to the phase comparator 9 as a signal S3 through the driver circuit 7, the switches 8a and 8b and the receiver circuit 2. As a result, the signal S3 output from the receiver circuit 2 will include the total time delay caused by the driver circuit 7 and the receiver circuit 2. Therefore, the phase comparator 9 detects this total time delay, i.e. the phase difference, by comparing the phases of the signals S3 and S7. The phase comparator 9 applies the detected phase difference signal S10 to the phase control circuit 10.

Upon receiving a periodical timing signal S4 generated from the PLL circuit 4, the phase control circuit 10, outputs a signal S5 with its phase controlled based on the signal S10. That is, the signal S4 generated from the PLL circuit 4 is delayed (or advanced) in accordance with the signal S10 representing the phase difference between the signal S3 and S7 so that the phase controlled signal S5 is applied to the data buffer 6. Once the phase difference between the signal S3 and S7 is measured, the phase difference signal S10 will be held within the phase control circuit 10. This will complete the measurement of the total phase deviation.

After completion of the measurement of the total phase deviation, the signal Sm will not be applied. Therefore, each of switches 8a and 8b selects the terminal A in response to the switching signal Sx. As a result, a received data signal on the receiving bus 19a is applied to the receiver circuit 2. Therefore, this transmitter/receiver 21 carries out the operation similar to that of the conventional transmitter/receiver 27 shown in FIG. 9. In this case, comparative operation by the phase comparator 9 is not performed. The received data signal S3 received by the receiver circuit 2 is applied to the PLL circuit 4. The PLL circuit 4 generates, in synchronization with the applied signal S3, a periodical timing signal S4 and apply it to the phase control circuit 10. The measured phase difference signal S10 is stored in the phase control circuit 10 thereby delaying the signal S4 to reduce the phase difference. The delayed signal, i.e. the signal S5 with its phase controlled by the phase control circuit 10 is applied to the data buffer 6. The data buffer 6 holds the transmitting data Dt from the LAPD controller 22 in response to the phase control signal S5. The driver circuit 7 is responsive to the transmitting data signal S7 held within the data buffer 6 to drive the transmitting bus 19a.

Figure 2:
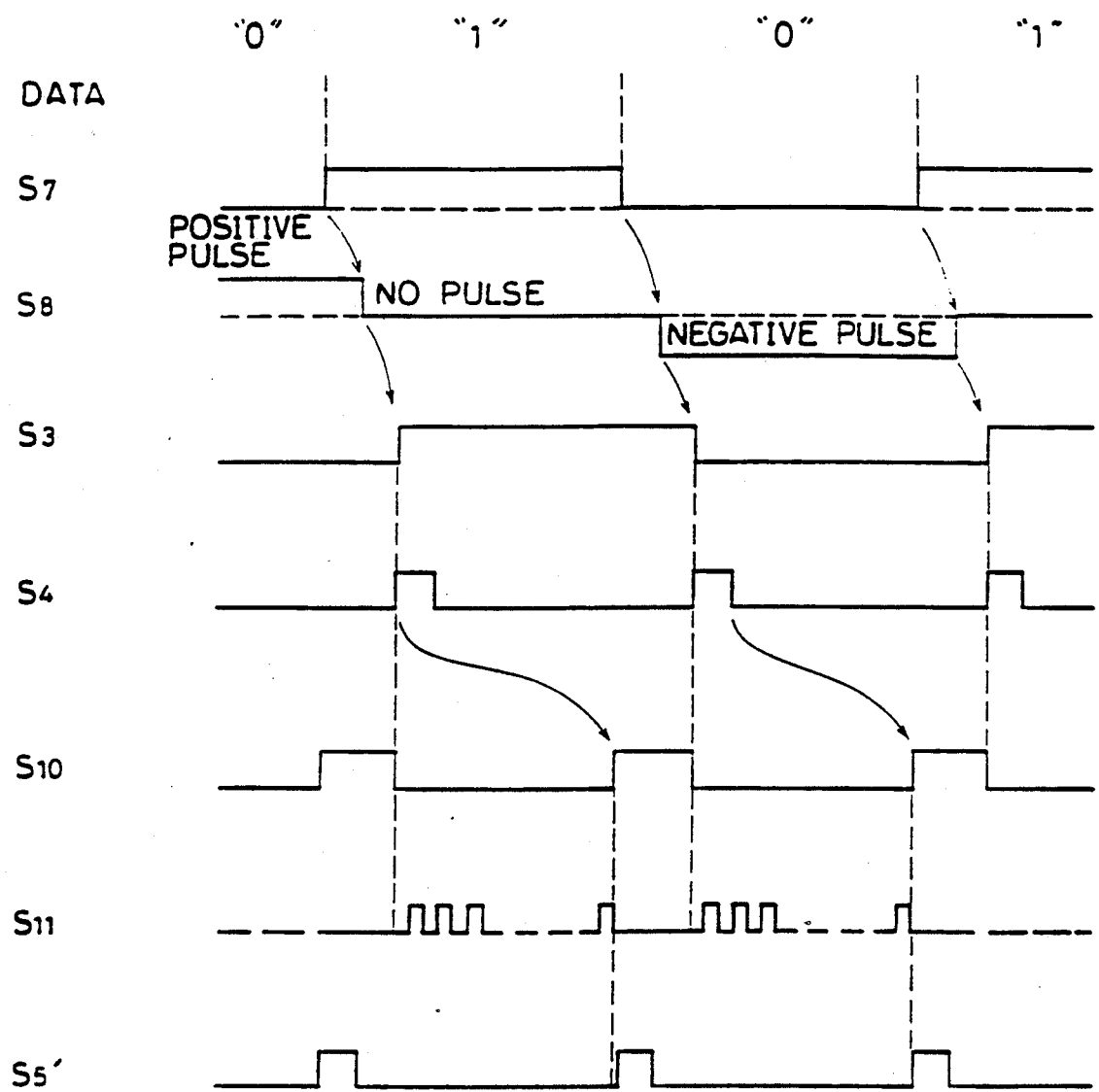
FIG. 2 is a timing diagram of the transmitter/receiver shown in FIG. 1.

The main signals in the transmitter/receiver 21 shown in FIG. 1 are shown in a timing diagram of FIG. 2. In the total phase deviation measurement mode, the data buffer 6 generates a data signal S7 (binary code "0, 1, 0, 1") as shown in FIG. 2. The driver circuit 7 is responsive to the signal S7 to output a delayed signal S8 (AMI code). This delay is caused by the driver circuit 7. The signal S8 is applied to the receiver circuit 2 through the switches 8a and 8b. The receiver circuit 2 outputs the signal S3 converted into binary code. This signal S3 is delayed compared to the signal S8. This delay is caused by the receiver circuit 2. The PLL circuit 4 generates a periodical timing signal S4 in synchronization with the signal S3. The generated signal S4 is applied to the data buffer 6 as a signal S5 (assume that the phase control amount by the phase control circuit 10 is originally 0). The phase comparator 9 compare the phases of the signals S3 and S7 and outputs a phase difference signal S10. This signal S10 is stored in the phase control circuit 10 as described above.

In normal data transmission/reception mode, the phase control circuit 10 delays a periodical timing signal S4 generated by the PLL circuit 4 in accordance with the stored signal S10. Therefore, the phase control circuit 10 outputs a phase control timing signal S5' so as to reduce the phase difference between the signal S3 and S7. The data buffer 6, outputs the transmitting data signal S7 in response to the phase control signal S5' thereby reducing the phase difference between the received data signal and the transmitting data signal.

Figure 3:
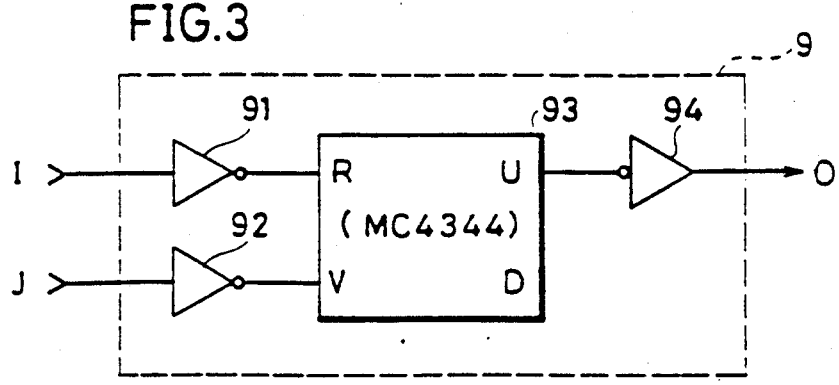
FIG. 3 is a block diagram of the phase comparator shown in FIG. 1.
Figures 4A, 4B:
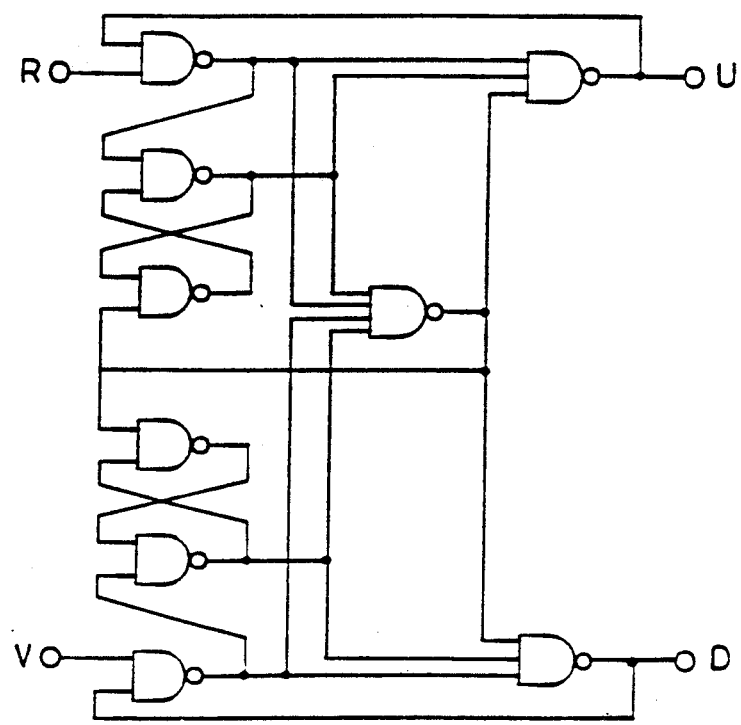
FIG. 4A is a truth table of logic elements shown in FIG. 3.
FIG. 4B is a diagram showing the circuit of logic elements shown in FIG. 3.
Figure 7:
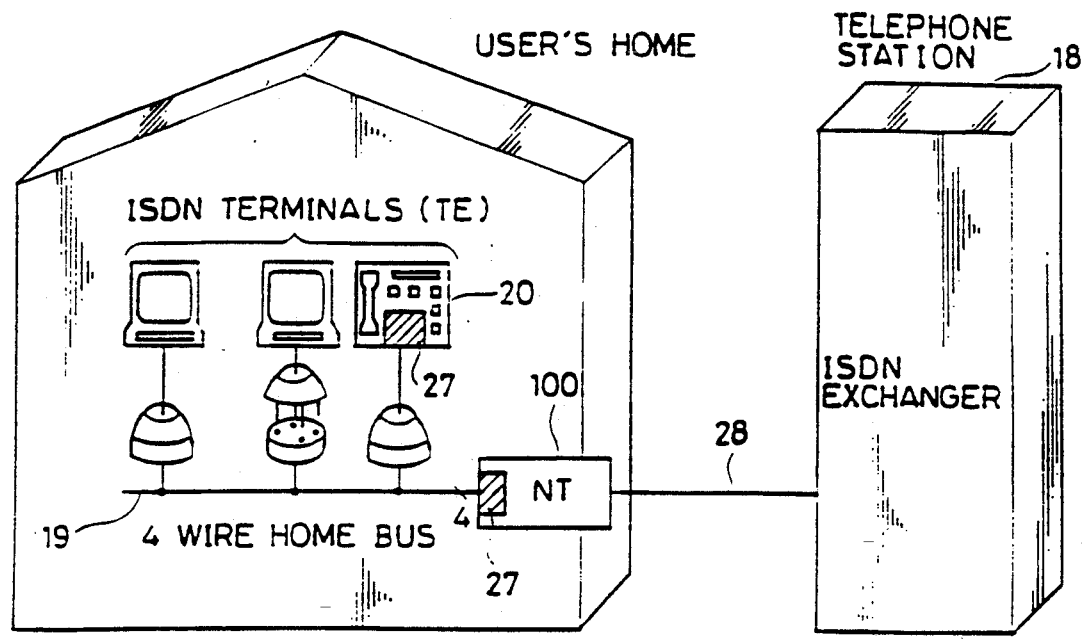
FIG. 7 is a conceptional diagram of the Integrated Service Digital Network (ISDN).
Figure 8:
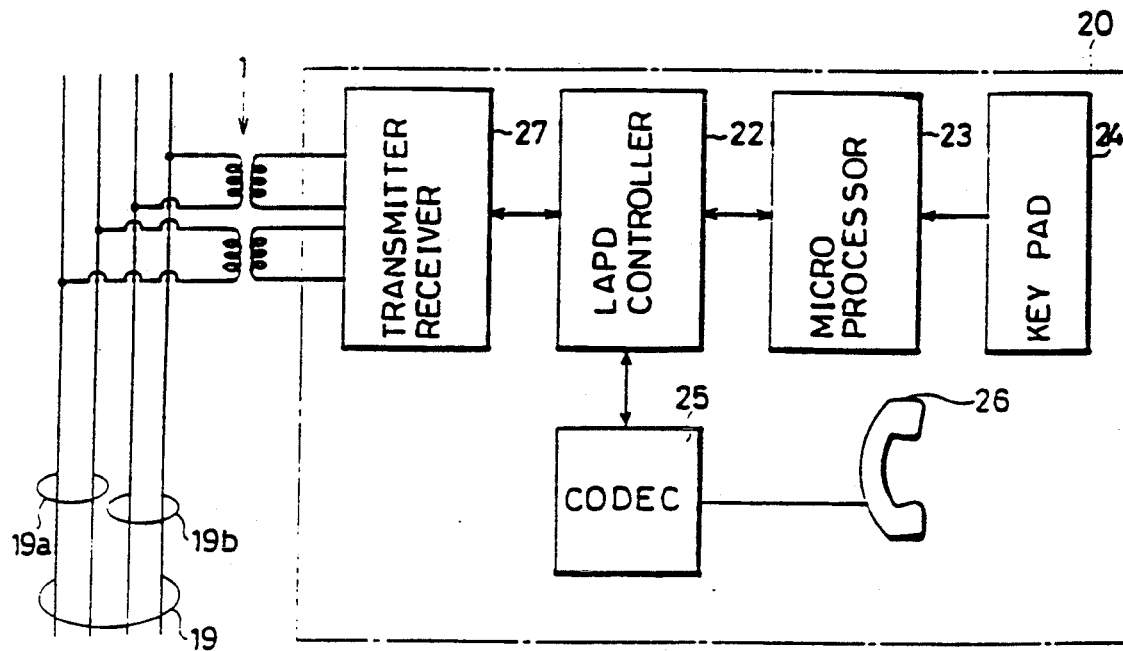
FIG. 8 is a block diagram of the telephone shown in FIG. 7.

An example of the phase comparator 9 of FIG. 1 is shown in FIG. 3. Referring to FIG. 3, this phase comparator 9 comprises three inverters 91, 92 and 94 and logic elements (Model No.: MC4344) 93. A truth table for describing the operation of this logic element 93 is shown in FIG. 4A. Referring to FIG. 4A, reference codes Un and Dn represent the present states of output terminals U and D while reference codes Un+1 and Dn+1 represent the states after input signals are applied to each terminal R and V. Reference code X represent an arbitrary input signal.

A circuit diagram of the logic elements 93 in FIG. 3 is shown in FIG. 4B.

Figure 5:
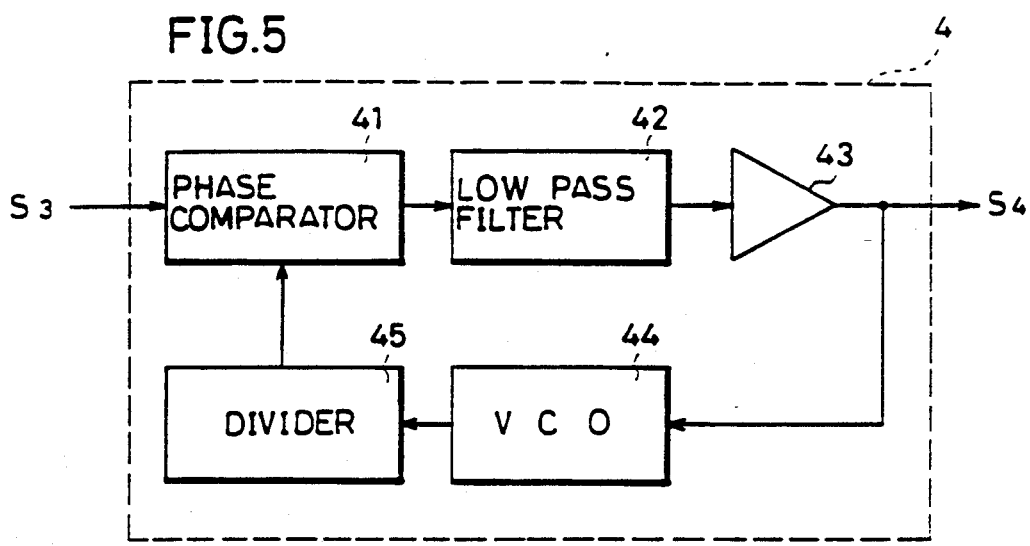
FIG. 5 is a block diagram of the PLL circuit shown in FIG. 1.

An example of the PLL circuit 4 in FIG. 1 is shown in FIG. 5. Referring to FIG. 5, this PLL circuit 4 comprises a phase comparator 41 connected to receive a received data signal S3 output from the receiver circuit 2, a low pass filter 42 connected to the output of the phase comparator 41, a d.c. amplifier 43 connected to the output of the low pass filter 42, a voltage controlled oscillator (referred to as VCO hereinafter) 44 which operates in response to the output signal S4 of the d.c. amplifier 43 and a frequency divider 45 for dividing the signal generated by VCO 44. The phase comparator 41, has one input of which connected to receive the signal S3, and has the other input connected to receive a signal generated from the frequency divider 45. Thus, the phase locked loop (PLL) is constituted.

In operation, the phase comparator 41 detects the phase difference between the signal S3 and the signal output from the frequency divider 45. The detected phase difference signal is applied to the d.c. amplifier 43 through the low pass filter 42. The oscillation frequency of the VCO 44 is changed as a function of the signal S4 amplified by the amplifier 43. The signal generated from the VCO 44 is applied to the phase comparator 41 through the frequency divider 45. As the above described feedback operation is repeated, a periodical timing signal S4 is obtained in synchronization with the applied received data signal S3. That means that the frequency of the timing signal S4 changes following the frequency of the input signal S3.

Figure 6:
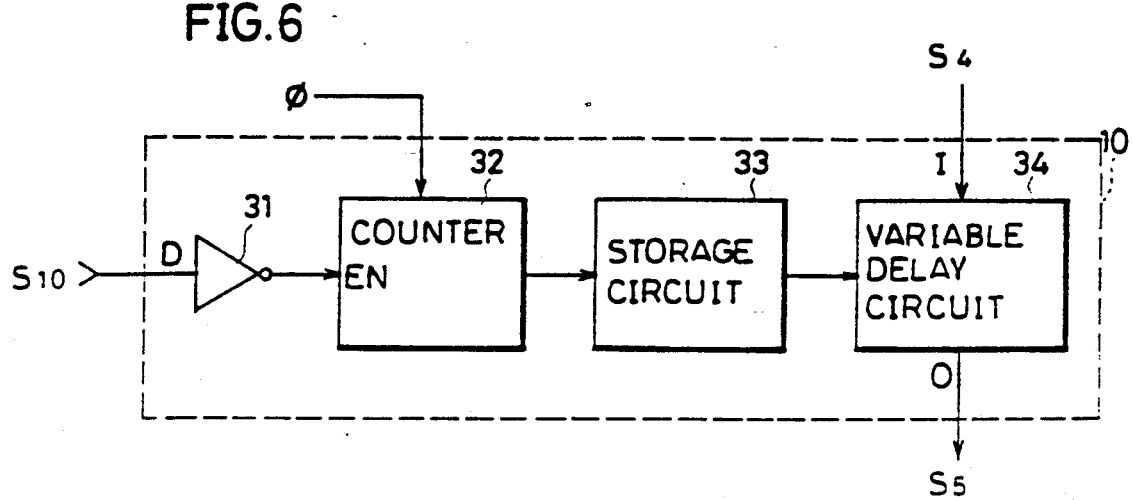
FIG. 6 is a block diagram of the phase control circuit shown in FIG. 1.

An example of the phase control circuit 10 in FIG. 1 is shown in FIG. 6. Referring to FIG. 6, this phase control circuit 10 comprises an inverter 31 to receive the phase difference signal S10, a counter 32 to be driven by a clock signal φ generated from the control part 5, a storage circuit 33 for storing an output signal from the counter, and a variable delay circuit 34 for delaying a periodical timing signal S4 based on a signal stored in the storage circuit 33. The variable delay circuit 34 delays the timing signal S4 by the time period corresponding to a predetermined phase difference and outputs a phase control signal S5.

In operation, the counter 32 receives a phase difference signal S10 generated from the phase comparator 9 through the inverter 31. Therefore, the counter 32 is enabled when the signal S10 is at a low level. As a result, the counter 32 counts the clock signal φ only during the period when the signal S10 is at a low level as shown in FIG. 2. That is, the signal S11 shown in FIG. 2 is counted by the counter 32 and the data signal representing the count result is stored in the storage circuit 33. That is, the data indicating the phase difference defined by the phase difference signal S10 is held in the storage circuit 33 and the time delay of the variable delay circuit 34 is controlled based on the held data.

Figure 12:
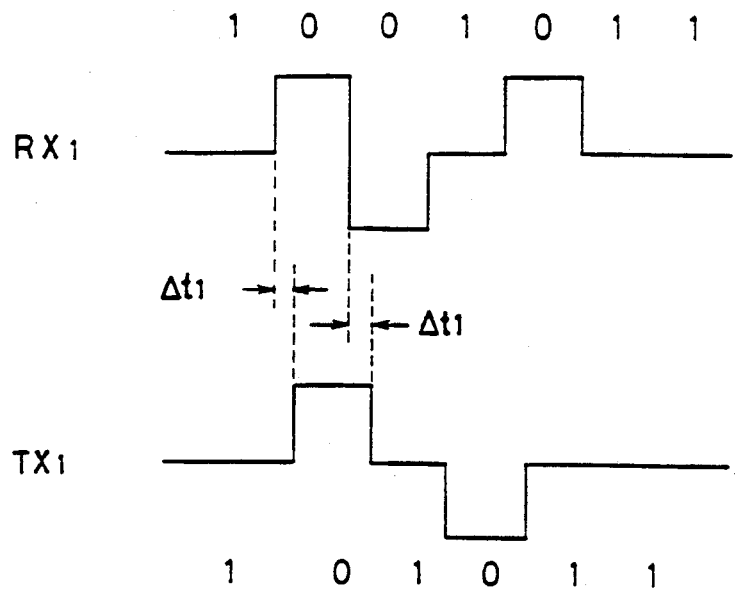
FIG. 12 is a timing diagram showing the phase difference between the received data signal and transmitting data signal at the ISDN terminals.
Figure 13:
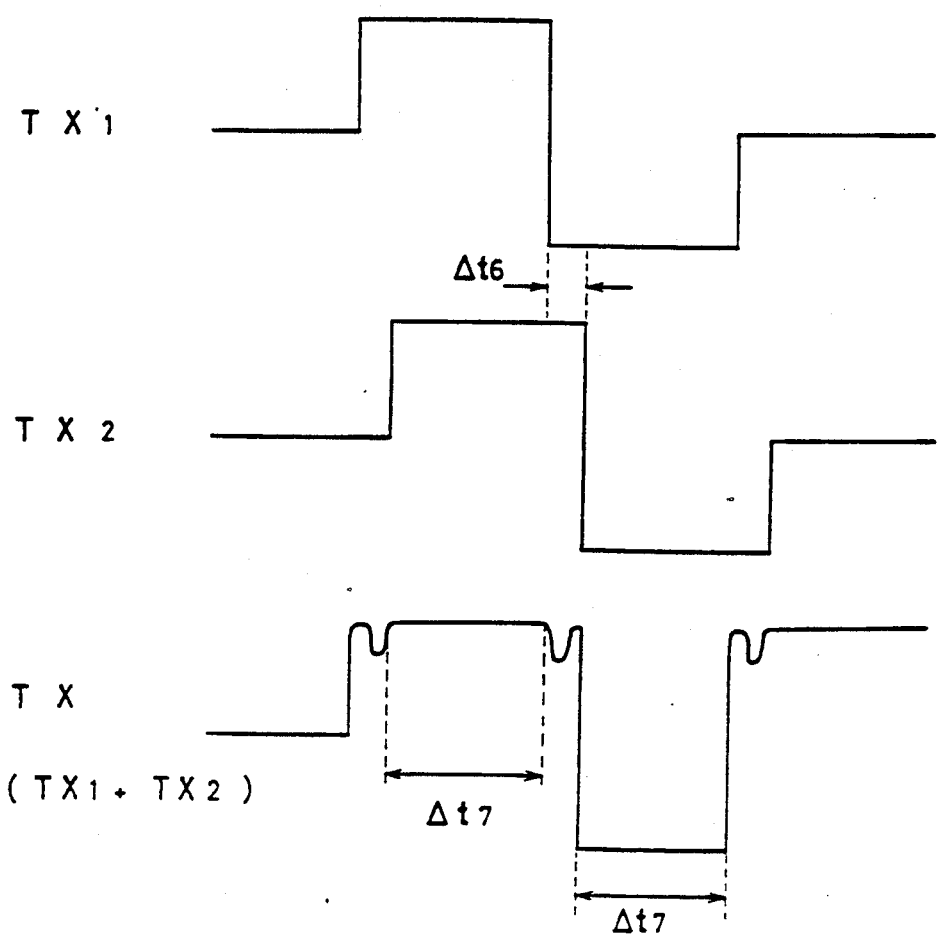
FIG. 13 is a timing diagram showing a case in which two transmitting data signals are overlapped on the transmitting bus.

As described above, since the transmitter/receiver 21 in FIG. 1 includes the phase comparator 9, in the total phase deviation measurement mode the time delay between the receiver circuit 2 and the driver circuit 7, i.e. the phase difference between the signals S3 and S7 is detected. The detected phase difference signal S10 is held in the phase control circuit 10 and the time delay of the periodical timing signal S4 generated from the PLL circuit 4 is determined by the held phase difference signal S10. As the data buffer 6 holds transmitting data Dt in response to the phase-controlled timing signal S5, the driver circuit 7 can output a transmitting data signal in synchronization with the received signal by the receiver circuit 2, i.e. a transmitting signal with its phase difference minimized. Therefore, by applying this transmitter/receiver 21 to an ISDN terminal, the phase difference Δt1 between the received data signal RX1 and the transmitting data signal TX1 shown in FIG. 12 can be reduced to the minimum. As a result, when two ISDN terminals are used on a 4-wire home bus simultaneously, the problem of the overlapped signals TX shown in FIG. 13 does not occur. Thus, the phase difference Δt6 between the two transmitting data signals TX1 and TX2 is reduced and, the time period Δt7 of the overlapped signal TX at a stable signal level is secured. As a result, transmitting signals are transmitted from each ISDN terminal to the network termination equipment 100 accurately.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A transmitter/receiver connected to a receiving bus line and a transmitting bus line comprising:
   receiving means for receiving a data signal through said receiving bus line and generating a received data signal;
   means for generating a periodical timing signal in synchronization with the received data signal;
   means, responsive to the generated periodical timing signal, for providing a transmitting data signal;
   means for transmitting the transmitting data signal through said transmitting bus line;
   means responsive to an applied mode designation signal for
   (i) triggering the means for providing to input a test data signal to said transmitting means, and
   (ii) selectively providing the receiving means with the signal transmitted by said means for transmitting in response to said test data signal, to provide a test input to signal said receiving means;
   phase difference detecting means connected to said means for transmitting and receiving means for detecting the phase difference between the test data signal input to said means for transmitting and the output of the receiving means produced in response to the test input signal; and
   timing control means responsive to said phase difference detecting means for controlling the timing of the periodical timing signal generated from said means for generating a periodical timing signal during subsequent transmitter/receiver operations when said mode designation signal is not applied.

2. The transmitter/receiver according to claim 1, wherein said timing control means includes delay means connected between said means for generating a periodical timing signal and said means for providing a transmittal data signal and responsive to said phase difference detecting means for delaying the supply of the periodical timing signal to said means for providing a transmitting data signal.

3. The transmitter/receiver according to claim 1, wherein said means for selectively providing the receiving means includes,
   switching means having a first input connected to receive said data signal from said receiving bus line and a second input connected to receive the signal transmitted by said means for transmitting.

4. The transmitter/receiver according to claim 1, wherein said means for generating a periodical timing signal includes,
   voltage controlled oscillator means, and
   second phase difference detecting means for detecting the phase difference between the received data signal applied from said receiving means and the signal generated from said voltage controlled oscillator means,
   said voltage controlled oscillator means being responsive to said second phase difference detecting means to generate said periodical timing signal.

5. The transmitter/receiver according to claim 1, wherein said transmitting data signal is externally applied and said means for providing a transmitting data signal includes transmitting data holding means responsive to said periodical timing signal for holding the applied transmitting data signal.

6. The transmitter/receiver according to claim 2, wherein said delay means includes,
   variable delay means connected between said means for generating a periodical timing signal and said means for providing a transmitting data signal, and
   delay control means responsive to a phase difference signal generated from said phase difference detecting means for controlling the delayed time of said variable delay means.

7. The transmitter/receiver according to claim 1, wherein said receiving means includes receiver circuitry for receiving the data signal through said receiving bus line, and
   said means for transmitting includes driver circuitry responsive to the transmitting data signal for driving said transmitting bus line.

8. The transmitter/receiver according to claim 1, wherein said receiving bus line and transmitting bus line constitute a 4-wire home bus line applicable to ISDN.

9. A method of transmitting a data signal in synchronization with a received data signal from a transmitter/receiver which is connected to a receiving bus line carrying receiving data signals and a transmitting bus line carrying transmitting data signals, said transmitter/receiver comprising a receiving means and a transmitting means, said method comprising the steps of:
   generating a transmitting data test signal in response to an externally applied designation signal;
   supplying the transmitting data test signal as an input to drive the transmitting means;
   selectively providing the output of the transmitting means responsive to the transmitting data test signal to the receiving means so that the receiving means outputs a receiving data test signal;
   detecting the phase difference between the transmitting data test signal input to the transmitting means and the receiving data test signal;
   receiving a data signal from the receiving bus line;
   in response to the receipt of a data signal, generating a timing signal based on the detected phase difference between the transmitting data test signal and the receiving data test signal;
   supplying the timing signal to the transmitting means; and
   transmitting a data signal from the transmitting means over the transmitting data bus line in response to the timing signal such that the transmitted data signal is synchronized with the received data.

10. A transmitter/receiver comprising:
    a switching means having first and second input nodes, an output node and a control node, said first input node receiving a data signal from a first bus, said output node selectively connected to one of either said first and second input nodes in response to a control signal received by said control node,
    a receiver for receiving a signal from the output node of said switching means and generating a first signal,
    an outputting means responsive to said first signal from said receiver,
    means for generating a periodical timing signal in synchronization with the first signal from said receiver,
    an inputting means responsive to said periodical timing signal and said first signal for outputting a second signal, and
    a driver responsive to said second signal for outputting a signal to a second bus and the second input node of said switching means, wherein
    said inputting means includes a phase difference detecting means for selectively detecting the phase difference between said first and second signals for controlling outputting said second signal by said inputting means.

11. The transmitter/receiver according to claim 10, wherein said switching means, said receiver, said outputting means, said means for generating a periodical timing signal, said inputting means and said driver are formed on a chip.

* * * * *